May 21, 1929.  W. N. ANGELUS  1,714,067
VEHICLE SPRING
Filed Aug. 11, 1927
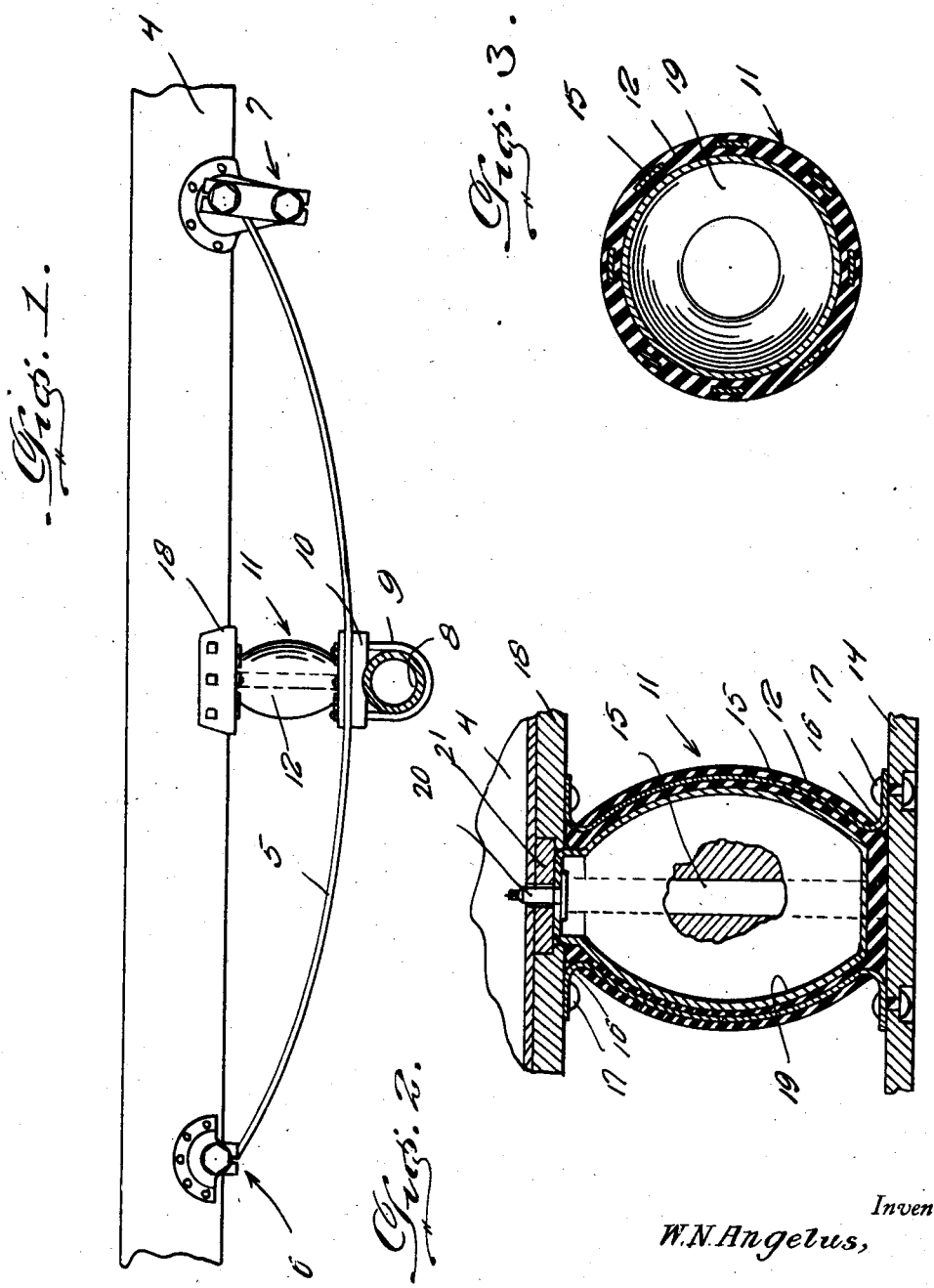
Inventor
W. N. Angelus,
By Clarence A. O'Brien
Attorney Patented May 21, 1929.

1,714,067

UNITED STATES PATENT OFFICE.

WILLIAM NICHOLAS ANGELUS, OF ALMA, MICHIGAN.

VEHICLE SPRING.

Application filed August 11, 1927. Serial No. 212,341.

This invention relates broadly to an improved vehicle spring, especially adapted for use in association with automobiles and the like.

The invention has more particular reference to a pneumatic cushioning device which is interposed between the central portion of a semi-elliptical spring, and a cooperating portion of a chassis bar, the device being especially designed to effectively absorb shocks, and to otherwise provide an efficient resilient support for the automobile body.

The invention is characterized by the presence of a substantially egg-shaped bag containing an inflatable bladder, the latter being provided with an ordinary tire inflation valve, and the bag being equipped with reinforcing and attaching means.

The features of novelty will become more readily apparent from the following description and drawings.

In the drawings:—

Figure 1 is a side view of the improved spring, showing the manner in which it is applied.

Fig. 2 is an enlarged fragmentary vertical section through the primary parts of the structure.

Fig. 3 is a horizontal section, through the pneumatic part of the invention.

In the drawings, the reference character 4 designates a channel-shaped chassis bar with which the semi-elliptical spring (either single or multiple ply), 5 is attached. The spring is attached at one end as at 6 and attached at its other end through the medium of the shackle 7. The reference character 8 designates an axle, provided with a U-shaped clip 9 having a top plate 10 forming what may be designated as a chair.

The improved pneumatic device is generally represented by the reference character 11 and as before indicated, it comprises a substantially egg-shaped bag or casing 12 constructed of appropriate material, such as for instance, material which is employed in the construction of automobile tire casings. It is open at its top and provided with a flat bottom (see Fig. 2) to rest upon a base plate 14. Incidentally, the base plate is fastened to the intermediate portion of the spring 5 and the aforesaid chair 10, by bolts or other fastenings. Embedded in the bag as shown in Fig. 2, we find a plurality of reinforcing strips 15, having a curvature corresponding to the curvature of the sides of the bags.

It will be noticed however, that the end portions 16 of these strips are extended outwardly beyond the bag and bent in a right angular manner and secured by fastenings 17. The bottom fastening is secured to the base plate 14, while the top fastening is secured to a suitable clamp 18 bolted to the chassis bar 4. Confined within the bag is an inflatable bladder 19 whose top portion is provided with an ordinary tire valve 20.

In this connection it will be noted in Fig. 2, that the upper portion of this bladder is receiveable in an opening which is cut in a portion of the clamp 18 and bears against a small backing disk 21 located in the opening. The disk is of course provided with a central opening to accommodate the tire valve, and to permit the same to be readily inflated by attaching the pump thereto in an obvious manner.

It is believed that after considering the detailed description in connection with the drawings, a clear understanding of the construction, and method of application of the invention will be had. It is also obvious that the reinforcing strips 15 which are of a yieldable nature, not only serve to reinforce the egg-shaped casing, but they tend to resist contraction and expansion and serve noticeably in checking violent rebounds.

It is thought however, that such advantages as these will be quite clear to persons skilled in the art to which the invention relates. Hence, a more lengthy description is believed unnecessary.

Minor changes in size, and re-arrangement of parts, coming within the field of invention claimed, may be resorted to if desired.

Having thus described my invention, what I claim as new is:—

1. In a shock absorbing and cushioning device of the class described, a clamp adapted to be fastened upon the chassis bar, a base plate adapted to be attached to an axle, an elastic hollow bag interposed between said clamp and base plate, reinforcing strips embedded in said bag, and having their ends fastened respectively to said clamp and base plate, and an inflatable bladder contained in said bag.

2. As a new product of manufacture, a cushioning device for a vehicle spring comprising a substantially egg-shaped bag open at its top and having a flat closed bottom, reinforcing strips embedded in the side walls of said bag and having their ends extending beyond opposite end portions of the bag and directed outwardly at right angles for anchorage, and an inflatable bladder contained in said bag and provided at its top with an ordinary tire valve.

In testimony whereof I affix my signature.

WILLIAM NICHOLAS ANGELUS.